(12) United States Patent
Chen

(10) Patent No.: US 10,732,058 B2
(45) Date of Patent: Aug. 4, 2020

(54) FORCE MEASUREMENT SYSTEM FOR EXERCISE EQUIPMENT

(71) Applicant: Direction Technology Co., Ltd., New Taipei (TW)

(72) Inventor: Yu-Yu Chen, New Taipei (TW)

(73) Assignee: DIRECTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/051,373

(22) Filed: Jul. 31, 2018

(65) Prior Publication Data
US 2019/0041282 A1 Feb. 7, 2019

(30) Foreign Application Priority Data
Aug. 1, 2017 (TW) .............................. 106125944 A

(51) Int. Cl.
| | | |
|---|---|---|
| *G01L 1/00* | (2006.01) | |
| *G01L 5/00* | (2006.01) | |
| *G01L 1/22* | (2006.01) | |
| *A63B 24/00* | (2006.01) | |

(52) U.S. Cl.
CPC .......... *G01L 1/2293* (2013.01); *G01L 1/2237* (2013.01); *G01L 5/0033* (2013.01); *A63B 24/0087* (2013.01)

(58) Field of Classification Search
CPC .. G01L 1/2293; G01L 5/0033; A63B 24/0087

USPC ........................................................... 73/777
See application file for complete search history.

(56) References Cited

U.S. PATENT DOCUMENTS

| | | | | |
|---|---|---|---|---|
| 6,018,677 | A * | 1/2000 | Vidrine | A61B 5/222 600/520 |
| 2004/0018915 | A1* | 1/2004 | Reyes | A63B 22/02 482/1 |
| 2012/0214646 | A1* | 8/2012 | Lull | G01L 3/242 482/5 |
| 2016/0209281 | A1* | 7/2016 | Carrasco Vergara | B62M 3/003 |
| 2019/0015702 | A1* | 1/2019 | Krebs | A63B 24/0087 |
| 2019/0041282 | A1* | 2/2019 | Chen | G01L 1/2293 |

\* cited by examiner

*Primary Examiner* — Max H Noori
(74) *Attorney, Agent, or Firm* — Chun-Ming Shih

(57) ABSTRACT

A force measuring system for exercise equipment provided for using in an exercise equipment, the system includes a measured body, a force sensor, a circuit board; a Wheatstone bridge, a data transmission module and a power module disposed on the circuit board; and a receiving device. The power module provides a working power supply. The measured body is connected to the exercise equipment. The force sensor is disposed on the measured body, and the resistance value thereof changes along with a deformation amount of the measured body. The Wheatstone bridge is electrically connected to the force sensor to output a measurement signal. The data transmission module transmits a force taken information to the receiving device, wherein the force taken information is obtained according to the measurement signal.

11 Claims, 13 Drawing Sheets

FORCE MEASUREMENT SYSTEM FOR EXERCISE EQUIPMENT

REFERENCE TO RELATED APPLICATIONS

The present application is based on, and claims priority from, Taiwan application number 106125944, filed 2017 Aug. 1, the disclosure of which is hereby incorporated by reference herein in its entirety.

BACKGROUND OF THE INVENTION

Field of the Invention

The present invention relates to a force measuring system for exercise equipment and more particularly to a force measuring system for exercise equipment capable of connecting to an exercise equipment and directly reflecting the work done by the user on the exercise equipment.

Description of the Prior Art

In traditional exercise equipment that provides weight training for users, the pulling or lifting force is mainly indirectly referenced to the weight of weight stacks on the exercise equipment; or, in traditional rowing machines or other exercise equipment, the torque measurement can only be indirectly converted from the data of its generator or brake resistance system.

In can be known from the above examples that whether it is weight training or rowing machine of exercise equipment, the torque data is simply indirectly referenced to the weight of the weight stacks, or indirectly converted and calculated from the resistance data of the exercise equipment, rather than the work done by the user in real fitness exercise. Since the damping of the exercise equipment in motion is not completely consumed by the user, and some of the work done by the user on the exercise equipment is virtual work, the weight of the weight stacks or the indirect conversion data lacks reference value.

SUMMARY OF THE INVENTION

In view of this, a main object of the present invention is to provide a force measuring system for exercise equipment, which generates a measurement signal that can reliably reflect the work performed by the user on the exercise equipment. Compared with the prior art, the measurement signal generated by the present invention can be more valuable as a reference.

The force measuring system for exercise equipment of the present invention is provided for using in an exercise equipment, comprising:

a measured body for connecting the exercise equipment;
at least one force sensor disposed on the measured body, a resistance value thereof changing according to a deformation amount of the measured body;
a circuit board;
a Wheatstone bridge disposed on the circuit board, the Wheatstone bridge being electrically connected to the at least one force sensor and generating an output voltage as a measurement signal;
a data transmission module disposed on the circuit board to externally transmit a force taken information, the force taken information being obtained according to the measurement signal;
a power module disposed on the circuit board and electrically connected to the Wheatstone bridge, the at least one force sensor and the data transmission module for providing a working power supply; and
a receiving device connected to the data transmission module for receiving the force taken information.

According to the structure of the present invention, the user directly applies a force on the measured body, wherein the degree of force applied by the user is positively related to the deformation amount of the measured body, that is, the greater the work performed by the user on the exercise equipment, the larger the deformation amount of the measured body, and the greater the amount of change in the resistance generated by the force sensor and the measurement signal generated by the Wheatstone bridge. Since the present invention allows the user to directly apply the force to the measured body, the measurement signal can directly reflect the work performed by the user on the exercise equipment. Therefore, compared with the prior art, the force taken information generated by the present invention has more reference value.

DETAILED DESCRIPTION OF THE PREFERRED EMBODIMENTS

Figure 1:
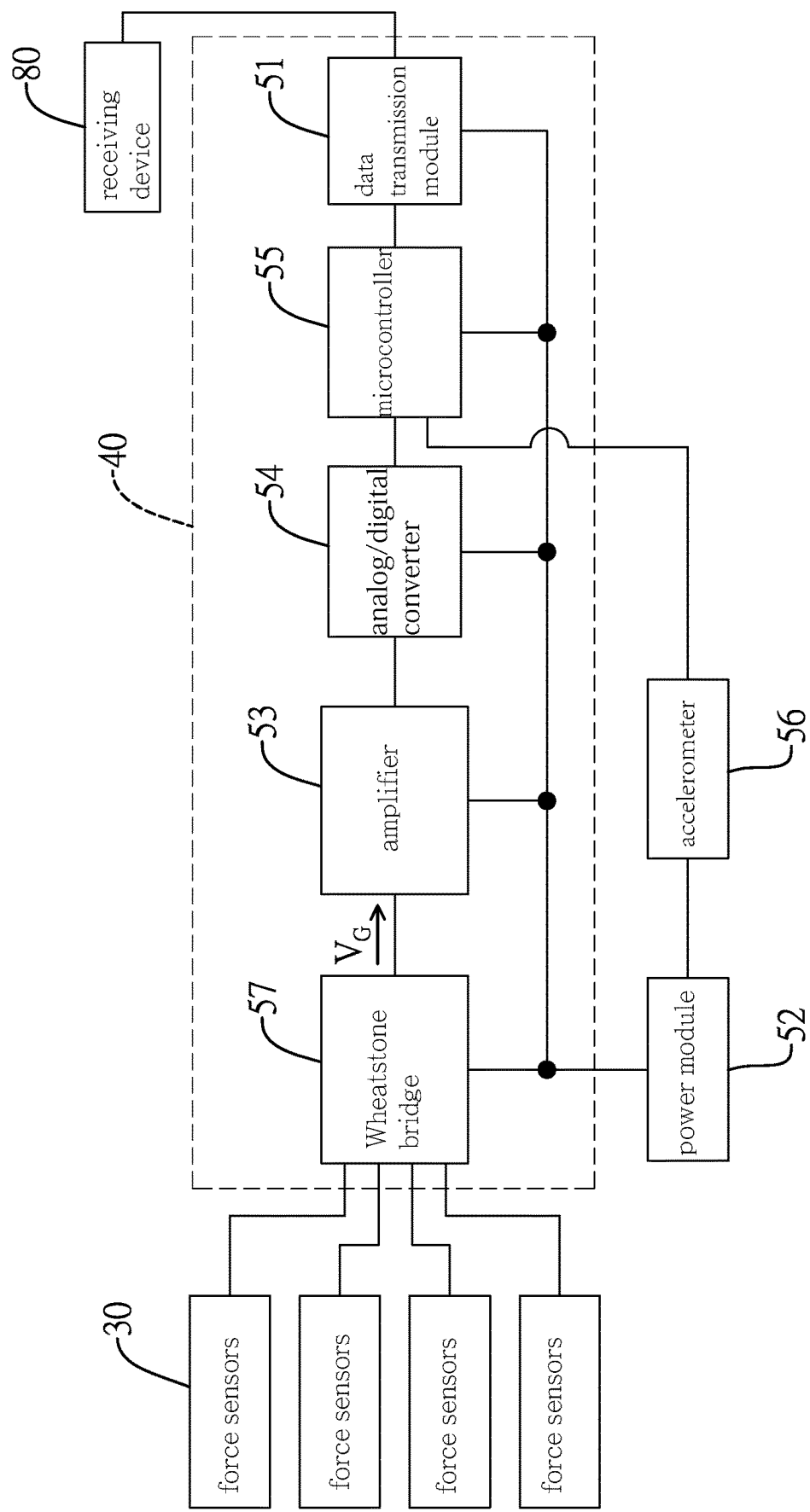
FIG. 1 is a circuit block diagram of an embodiment of the present invention.

A system of the present invention is provided for using in an exercise equipment. Please refer to FIG. 1, an embodiment of the force measurement system for the exercise equipment of the present invention comprises a measured body (not shown), at least one force sensor 30, a circuit board 40 and a receiving device 80. The circuit board 40 comprises or electrically connects a Wheatstone bridge 57, a data transmission module 51 and a power module 52. The measured body is provided for connecting the exercise equipment, and the exercise equipment can be a pull-down back training equipment, a rowing machine or a weight-lifting training equipment, but is not limited thereto.

The measured body is a member for taking a force to generate deformation. The larger the force taken by the measured body, the larger the amount of deformation thereof, and the embodiments of the measured body are described later. The at least one force sensor 30 can be a load cell sensor or a strain gauge sensor disposed on the measured body, and each of the force sensors 30 has a resistance value. When each of the force sensors 30 is deformed, the resistance value can change according to the amount of change of deformation. Since each of the force sensors 30 is disposed on the measured body, when the measured body is deformed, each of the force sensors 30 deforms accordingly, and its resistance value also changes along with it. In other words, the resistance value of each of the force sensors 30 is related to the deformation amount of the measured body.

The circuit board 40 can be disposed on or separated from the measured body. The circuit board 40 is electrically connected to the at least one force sensor 30. In addition, the circuit board 40 is provided for disposing with or externally electrically connecting to electronic components. The data transmission module 51 can be disposed on the circuit board 40. The data transmission module 51 can be a wired transmission module or a wireless transmission module (for example, a radio frequency module). The power module 52 is disposed on the circuit board 40 for providing a working power supply to the electronic components on the circuit board 40, for example, the power module 52 can be a rechargeable battery or a non-rechargeable battery.

Specifically, please refer to an embodiment in FIG. 1, the electronic components electrically connected to or disposed on the circuit board 40 can include the data transmission module 51, the power module 52, the Wheatstone bridge 57, an amplifier 53, an analog/digital converter 54 and a microcontroller 55. The power module 52 is electrically connected to the data transmission module 51, the Wheatstone bridge 57, the amplifier 53, the analog/digital converter 54 and the microcontroller 55 for providing a working power supply. The at least one force sensor 30 is electrically connected to the Wheatstone bridge 57. The amplifier 53 is electrically connected to the Wheatstone bridge 57 for signal amplification of an output voltage $V_G$ generated by the Wheatstone bridge 57. The output voltage $V_G$ is used as a measurement signal. The analog/digital converter 54 is electrically connected to the amplifier 53 for converting the analog type measurement signal into the digital type measurement signal. The microcontroller 55 is electrically connected to the analog/digital converter 54 for receiving the measurement signal to determine a force taken information according to the measurement signal; therefore the force taken information is obtained according to the measurement signal, and the force taken information can reflect the actual exercise state of the user. The data transmission module 51 is electrically connected to the microcontroller 55, and the microcontroller 55 externally transmits the force taken information through the data transmission module 51. For example, the data transmission module 51 can externally connect to the receiving device 80 in a wired manner or in a wireless manner, and the receiving device 80 can be an electronic meter or a smart mobile device of the exercise equipment, in order to transmit the force taken information to the receiving device 80 for display or further use by the receiving device 80.

Figure 2:
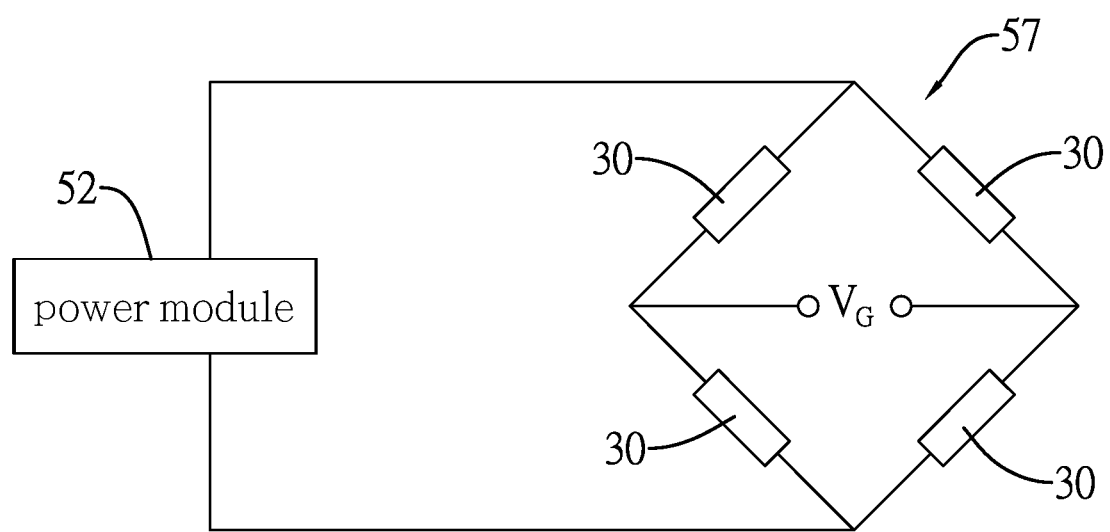
FIG. 2 is a circuit diagram of a Wheatstone bridge of the present invention.

Please refer to FIG. 2, using four of the force sensors 30 as an example in an embodiment, the force sensors 30 are electrically connected to the Wheatstone bridge 57, and the power module 52 is electrically connected to the Wheatstone bridge 57 to provide a working power supply. It should be explained that the Wheatstone bridge 57 is a well-known bridge circuit, and the four force sensors 30 are respectively connected to the bridge circuit. The Wheatstone bridge 57 generates the output voltage $V_G$ as the measurement signal according to the changes of the resistance values of the four force sensors 30, and the amplifier 53 receives the output voltage $V_G$ to provide to the subsequent analog/digital converter 54 and the microcontroller 55 for mathematical operation. In other embodiments of the Wheatstone bridge 57, the force sensor 30 and three resistor elements can be respectively connected to the bridge circuit, or the two force sensors 30 and two resistor elements are respectively connected to the bridge circuit, or the three force sensors 30 and a resistor element are respectively connected to the bridge circuit, which are not limited by the present invention.

Please refer to FIG. 1, an accelerometer 56 can be disposed on the measured body, and the accelerometer 56 generates an acceleration signal according to the moving state of the measured body. The microcontroller 55 is electrically connected to the accelerometer 56 for receiving the acceleration signal to assist in determining the exercise state of the user according to the acceleration signal, for example, the acceleration signal is used to calculate the motion speed or to determine whether the user is exerting a force excessively, etc.

Various embodiments of the measured body are described below.

Figure 3:
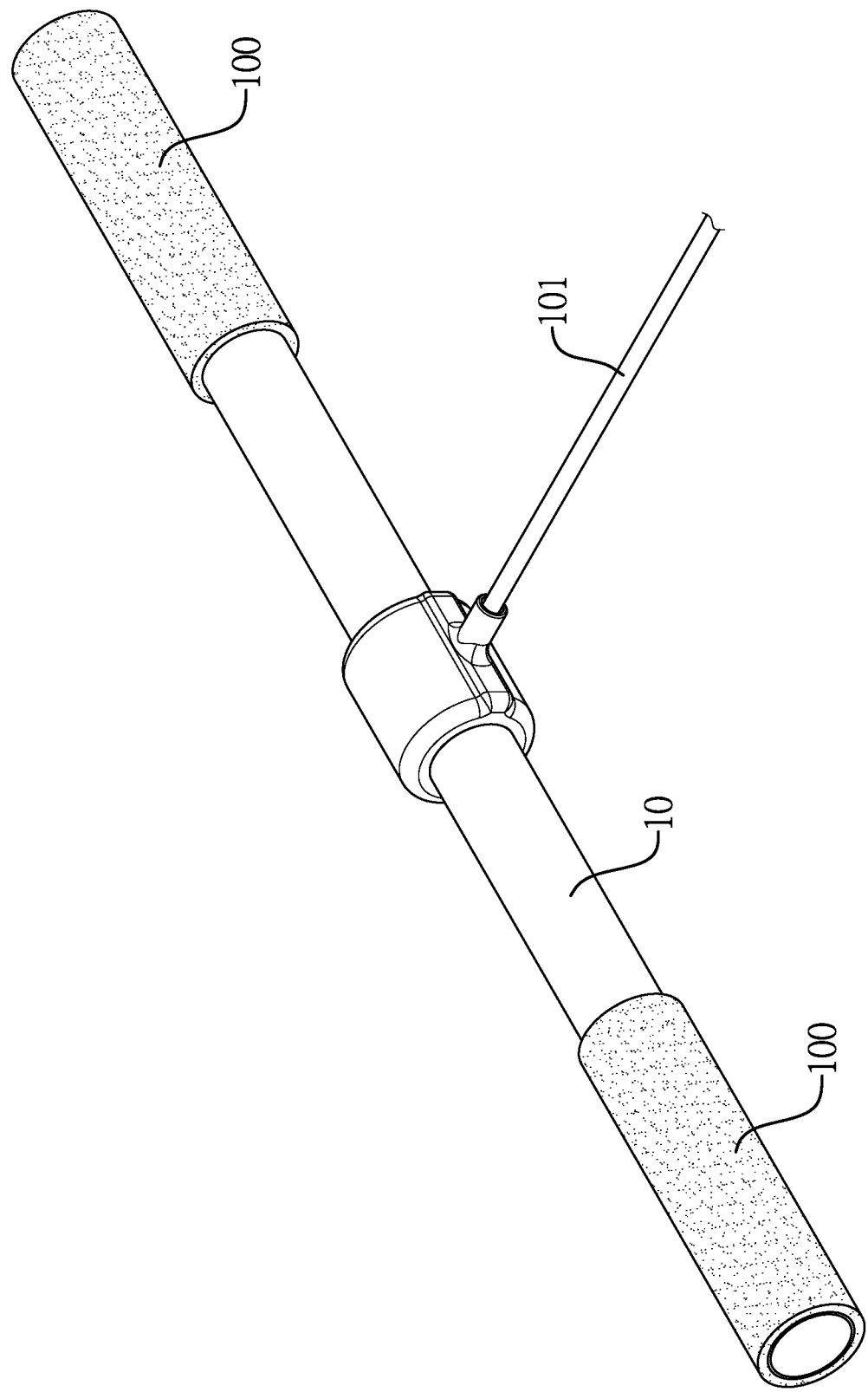
FIG. 3 is a perspective view of a first embodiment of a measured body of the present invention.
Figure 4:
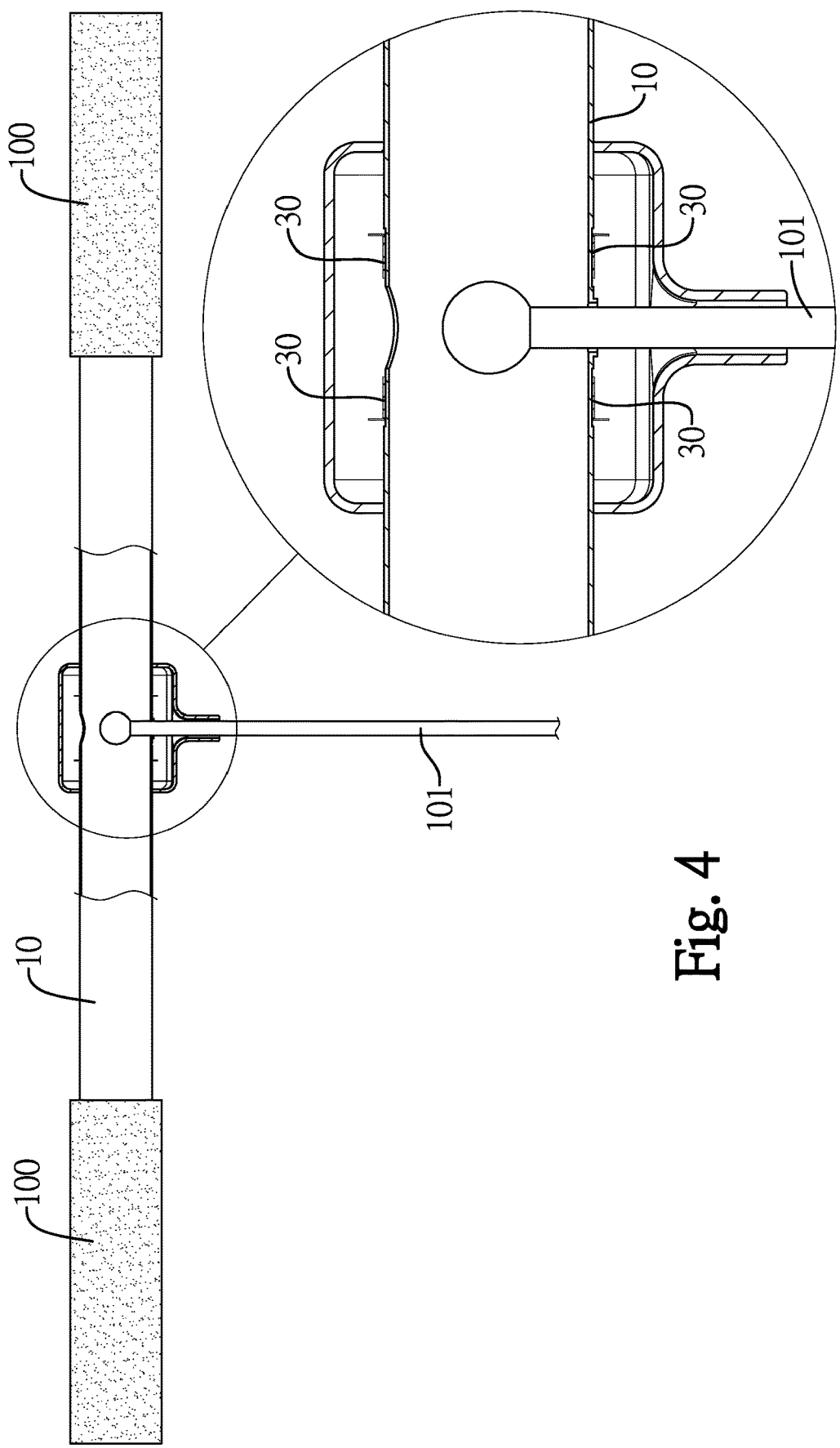
FIG. 4 is a partial cross-sectional view of the first embodiment of the measured body of the present invention.

Please refer to FIG. 3 and FIG. 4, a first embodiment of a measured body 10 can be a long rod. Two opposite ends of the long rod are respectively grips 100, and the grips 100 are for the user to hold. A center of the measured body 10 is connected to a rope 101, and the rope 101 is connected to a load unit (for example, a load block) through a transmission mechanism such as a pulley. The user can pull the measured body 10 to lift the load unit or drive the load unit to move. Please refer to FIG. 4, the four force sensors 30 can be attached to a surface of the measured body 10, two of the force sensors 30 are disposed on the surface of the measured body 10 and adjacent to an outer circumference of the rope 101, the other two force sensors 30 are respectively disposed oppositely to the aforementioned two force sensors 30. When the user pulls the measured body 10, the grips 100 at the two opposite ends of the measured body 10 are subjected to a pulling force applied by the user, and the center of the measured body 10 is subjected to a pulling force of the load unit. Therefore, the measured body 10 is affected by the aforementioned pulling forces to deform at the junction of the measured body 10 and the rope 101, and the resistance values of the force sensors 30 can be changed along with the deformation amount of the measured body 10. Thereby the output voltage $V_G$ outputted by the Wheatstone bridge 57 can be changed along with the deformation of the measured body 10 for the microcontroller 55 to calculate the force taken information.

Figure 5:
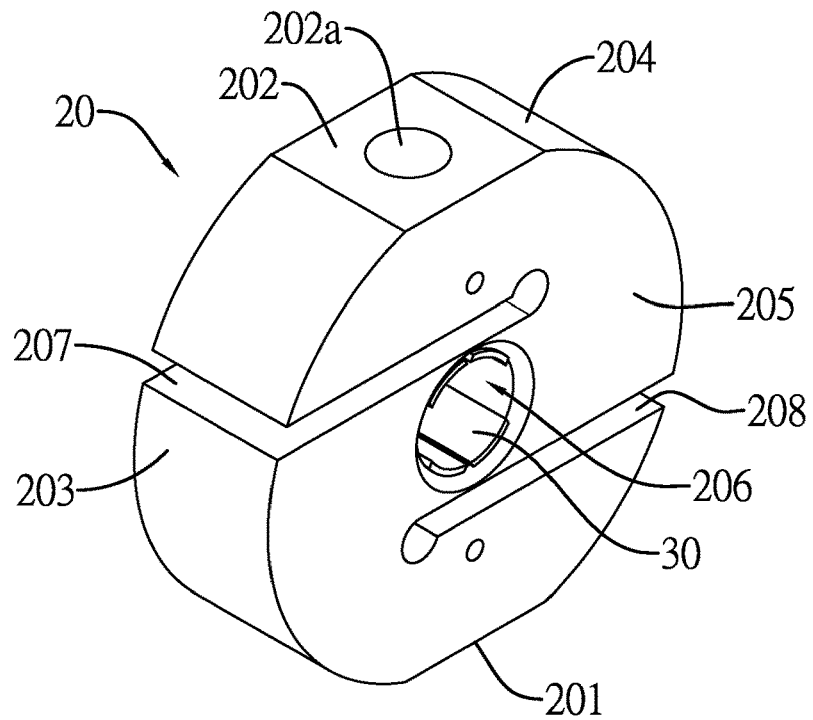
FIG. 5 is a perspective view of a second embodiment of the measured body of the present invention.
Figure 6:
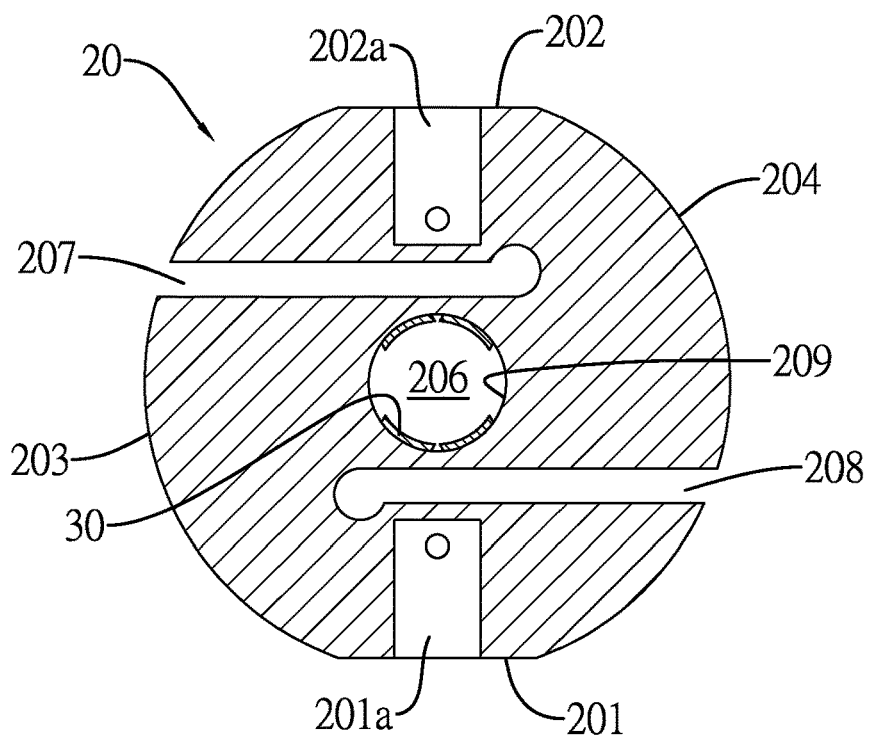
FIG. 6 is a cross-sectional view of the second embodiment of the measured body of the present invention.

Please refer to FIG. 5 and FIG. 6 showing a second embodiment of a measured body 20. The measured body 20 can be a plate-shaped block being roughly circular and having a thickness, and can be a member made of an aluminum alloy. The measured body 20 comprises a first connecting end portion 201, a second connecting end portion 202, a first outer peripheral surface 203, a second outer peripheral surface 204, two side surfaces 205, a recess 206, a first slot 207 and a second slot 208. An end face of the first connecting end portion 201 and an end face of the second connecting end portion 202 are oppositely disposed and can respectively have setting holes 201a, 202a. The first outer peripheral surface 203 and the second outer peripheral surface 204 are oppositely disposed and connected to the first connecting end portion 201 and the second connecting end portion 202 respectively. The two side surfaces 205 are two opposite sides, and can be perpendicular to the planes of the first outer peripheral surface 203 and the second outer peripheral surface 204. The recess 206 is concavely disposed at a central position of either one of the side surfaces 205. The first slot 207 can be a straight slot extending from the first outer peripheral surface 203 toward the second outer peripheral surface 204, and an end of the first slot 207 is located on one side of the recess 206 and maintains a spacing from the second outer peripheral surface 204. The second slot 208 can be a straight slot extending from the second outer peripheral surface 204 toward the first outer peripheral surface 203, and an end of the second slot 208 is located on another side of the recess 206 and maintains a spacing from the first outer peripheral surface 203. Wherein the second slot 208 is parallel to the first slot 207, and the first slot 207 and the second slot 208 go through the two side surfaces 205. The force sensors 30 are respectively disposed on an inner ring wall surface 209 of the recess 206.

Figure 7:
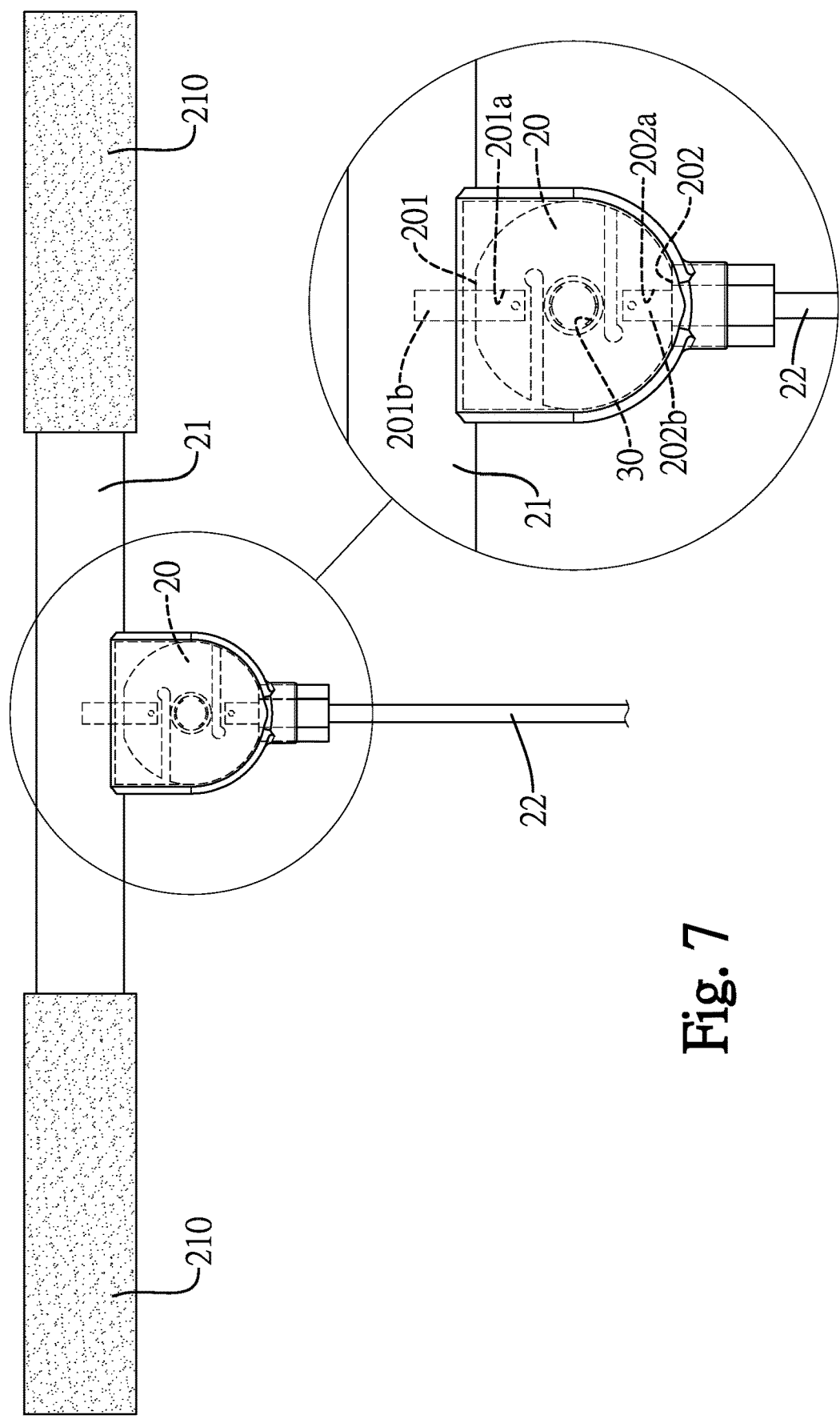
FIG. 7 is a first schematic view of the state of use of the second embodiment of the measured body of the present invention.

Please refer to FIG. 7 regarding the state of use of the second embodiment of the measured body 20. The first connecting end portion 201 of the measured body 20 can be connected to a center of a long rod 21, wherein a fixing block 201b can extend outwardly from the center of the long rod 21. The fixing block 201b extends into the setting hole 201a of the first connecting end portion 201, and is combined and fixed by means of snapping, latching or screwing, etc.; or an outer peripheral surface of the fixing block 201b can be formed with a thread, and an inner wall surface of the setting hole 201a of the first connecting end portion 201 can be formed with a thread, and the fixing block 201b is screwed into the setting hole 201a of the first connecting end portion 201. The manner in which the fixing block 201b is coupled to the first connecting end portion 201 is not limited thereto. Two opposite ends of the long rod 21 are respectively grips 210 for the user to hold, and the second connecting end portion 202 of the measured body 20 is connected to a rope 22, the connection can be such that the rope 22 is fixed (e.g. bind) to another fixing block 202b, and the other fixing block 202b is placed in the setting hole 202a of the second connecting end portion 202, and the aforementioned snapping, latching, screwing, etc. are used for combination and fixing, but it is not limited thereto. The rope 22 is connected to a load unit (for example, a load block) through a transmission mechanism such as a pulley. The user can pull the long rod 21 to lift the load unit or drive the load unit to move. At this time, the first connecting end portion 201 and the second connecting end portion 202 of the measured body 20 are respectively stretched by the pulling force applied by the user and the pulling force of the load unit, so that the measured body 20 is deformed, and the resistance values of the force sensors 30 located in the recess 206 can be changed along with the deformation amount of the measured body 20. Thereby the output voltage $V_G$ outputted by the Wheatstone bridge 57 can be changed along with the deformation of the measured body 20 for the microcontroller 55 to calculate the force taken information.

Figure 8:
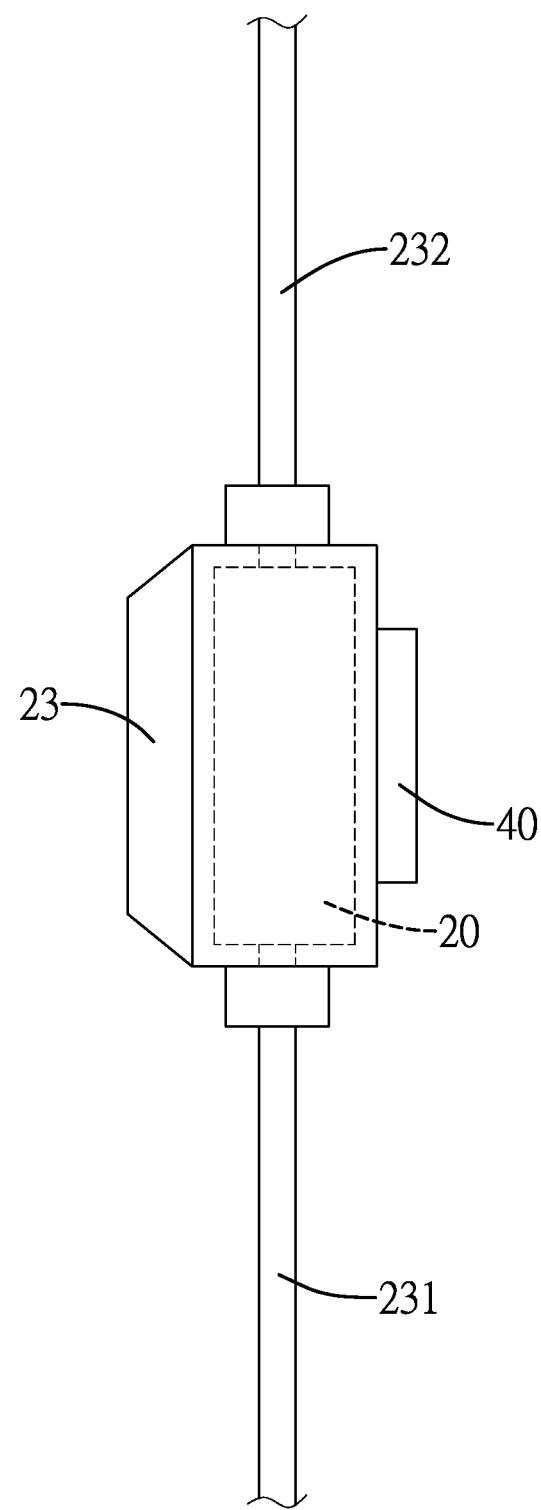
FIG. 8 is a second schematic view of the state of use of the second embodiment of the measured body of the present invention.
Figure 9:
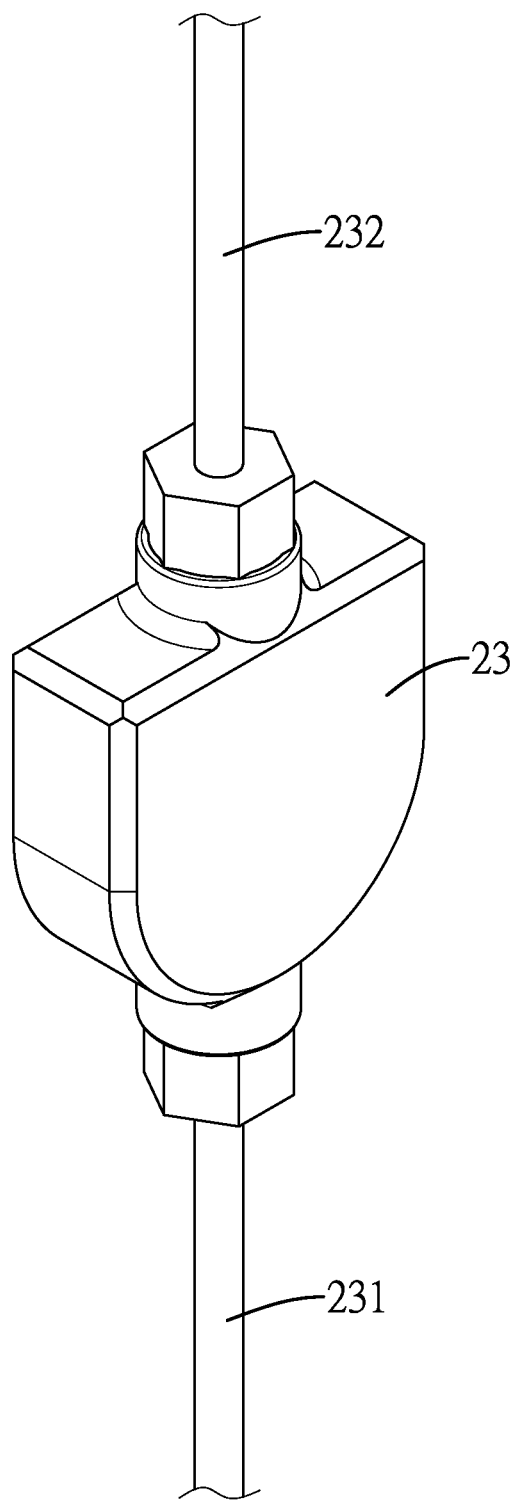
FIG. 9 is a third schematic view of the state of use of the second embodiment of the measured body of the present invention.
Figure 10:
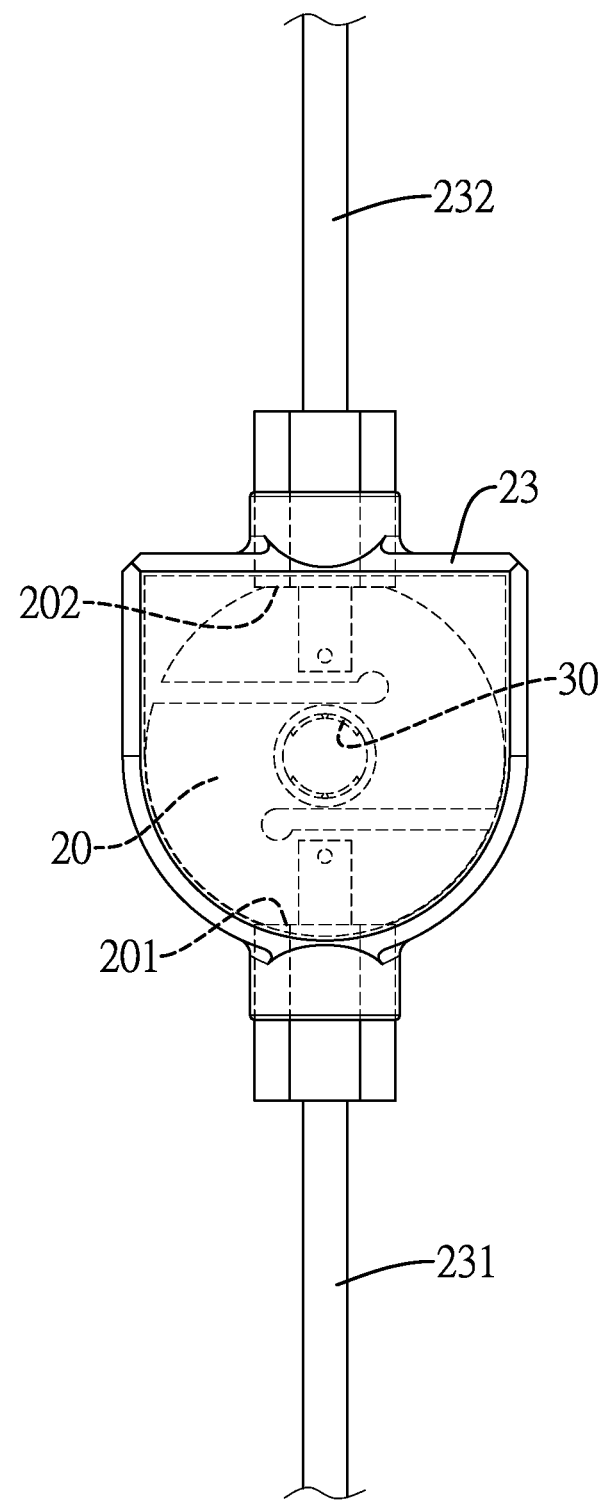
FIG. 10 is a fourth schematic view of the state of use of the second embodiment of the measured body of the present invention.

Please refer to another state of use of the second embodiment of the measured body 20 shown in FIG. 8, the measured body 20 can be disposed in a housing 23, the housing 23 can be a combined housing, and the circuit board 40 can be disposed on an outer surface of the housing 23. Specifically, with reference to FIG. 9 and FIG. 10, the first connecting end portion 201 of the measured body 20 can be connected to a first rope 231, the second connecting end portion 202 can be connected to a second rope 232. In other words, the first rope 231 and the second rope 232 can pass through the housing 23 to connect to the first connecting end portion 231 and the second connecting end portion 232 of the measured body 20, please refer to the embodiment of FIG. 7 for the connection manner. The second rope 232 can be connected to a load unit (for example, a load block) through a transmission mechanism such as a pulley, and the first rope 231 can be connected to a pull ring for the user to hold. Thereby, the user can pull the pull ring to lift the load unit or drive the load unit to move. At this time, the first connecting end portion 201 and the second connecting end portion 202 of the measured body 20 are respectively stretched by the pulling force applied by the user and the pulling force of the load unit, so that the measured body 20 is deformed, and the resistance values of the force sensors 30 can be changed along with the deformation amount of the measured body 20.

Figure 11:
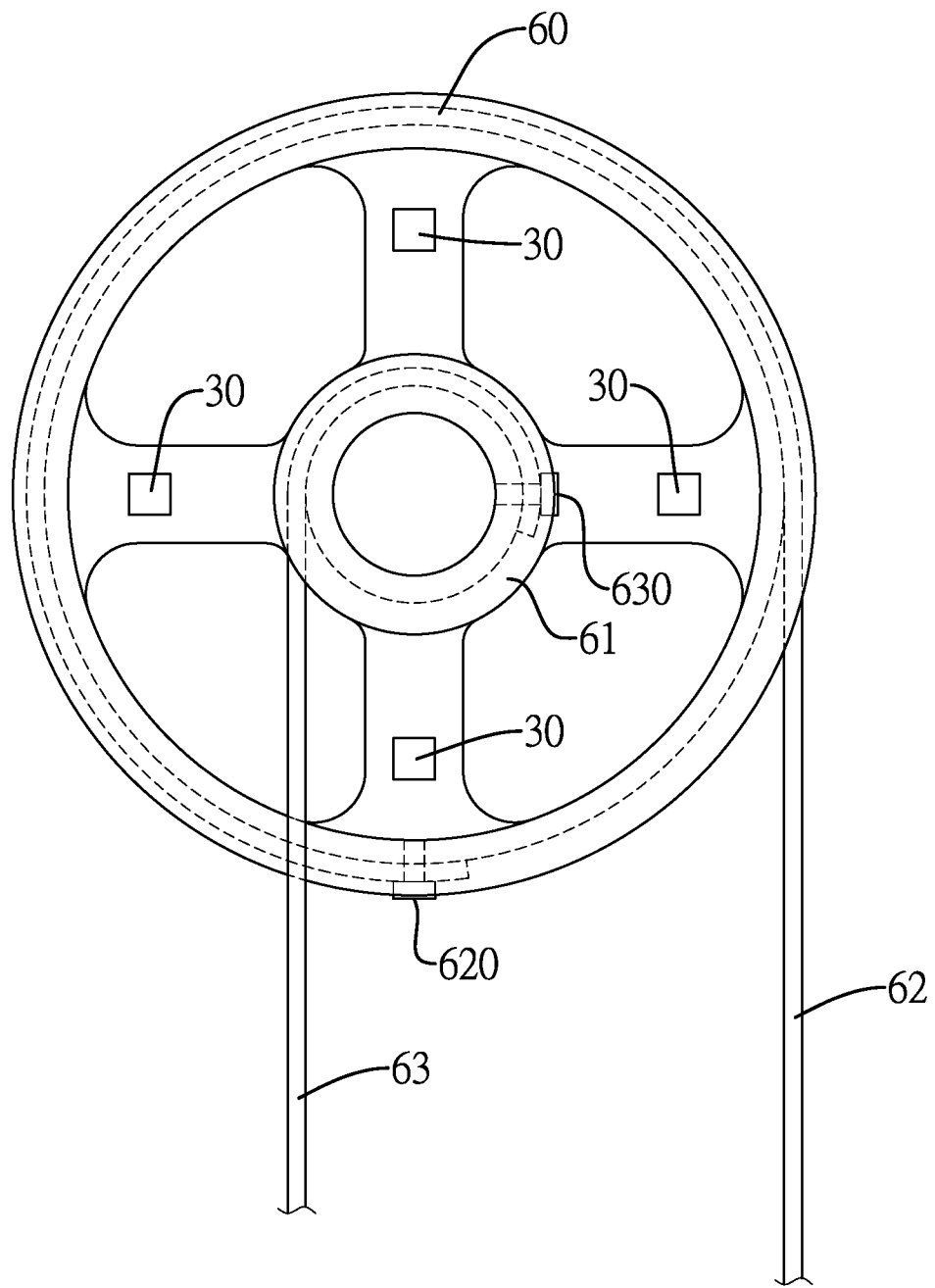
FIG. 11 is a plan view of a third embodiment of the measured body of the present invention.

Please refer to FIG. 11, a third embodiment of a measured body 60 can be a pulley. The pulley is disposed with a sleeve 61 at a center thereof. The sleeve 61 is provided for installing a shaft of the exercise equipment, wherein the diameter of the sleeve 61 is smaller than the diameter of the measured body 60 (pulley). An outer peripheral surface of the measured body 60 (pulley) is formed with a first fillister for disposing a first rope 62, and one end of the first rope 62 is fixed in the first fillister of the measured body 60 (pulley) by a first fixing member 620. An outer peripheral surface of the sleeve 61 can be formed with a second fillister for disposing a second rope 63, and one end of the second rope 63 is fixed in the second fillister of the sleeve 61 by a second fixing member 630. The four force sensors 30 are disposed on a side of the measured body 60 (pulley) at equal intervals along a circumference, and a center position of the circumference is an axial position of the shaft of the measured body 60 (pulley). Another end of the second rope 63 can be connected to a load unit (e.g. a load block), and another end of the first rope 62 can be connected to a pull ring or other articles for the user to hold. Thereby, the user can pull the pull ring to lift the load unit or drive the load unit to move. Since the measured body 60 (pulley) is subjected to the pulling forces of the load unit and the user, the measured body 60 (pulley) is affected by the aforementioned pulling forces to deform, and the resistance values of the four force sensors 30 are also changed. Therefore, the output voltage $V_G$ outputted by the Wheatstone bridge 57 can be changed along with the deformation of the measured body 60 for the microcontroller 55 to calculate the force taken information.

In addition, the power module 52 can be a coil inductive type comprising a power generating coil and a magnet besides being a battery. Using FIG. 11 as an example, the magnet can be fixedly mounted on the exercise equipment and separated from the measured body 60, so that the measured body 60 rotates relative to the magnet, and the power generating coil is disposed on the measured body 60 to rotate along with the measured body 60. Wherein the positions of the power generating coil and the magnet correspond to each other, so that when the measured body 60 rotates, the power generating coil moves relative to the magnet to generate an induced voltage, and the induced voltage is rectified or regulated to become the working power supply. It should be explained that the inductive power generation of the power generating coil and the magnet is a well-known technique and can be applied to the power module 52 of the present invention.

Figure 12:
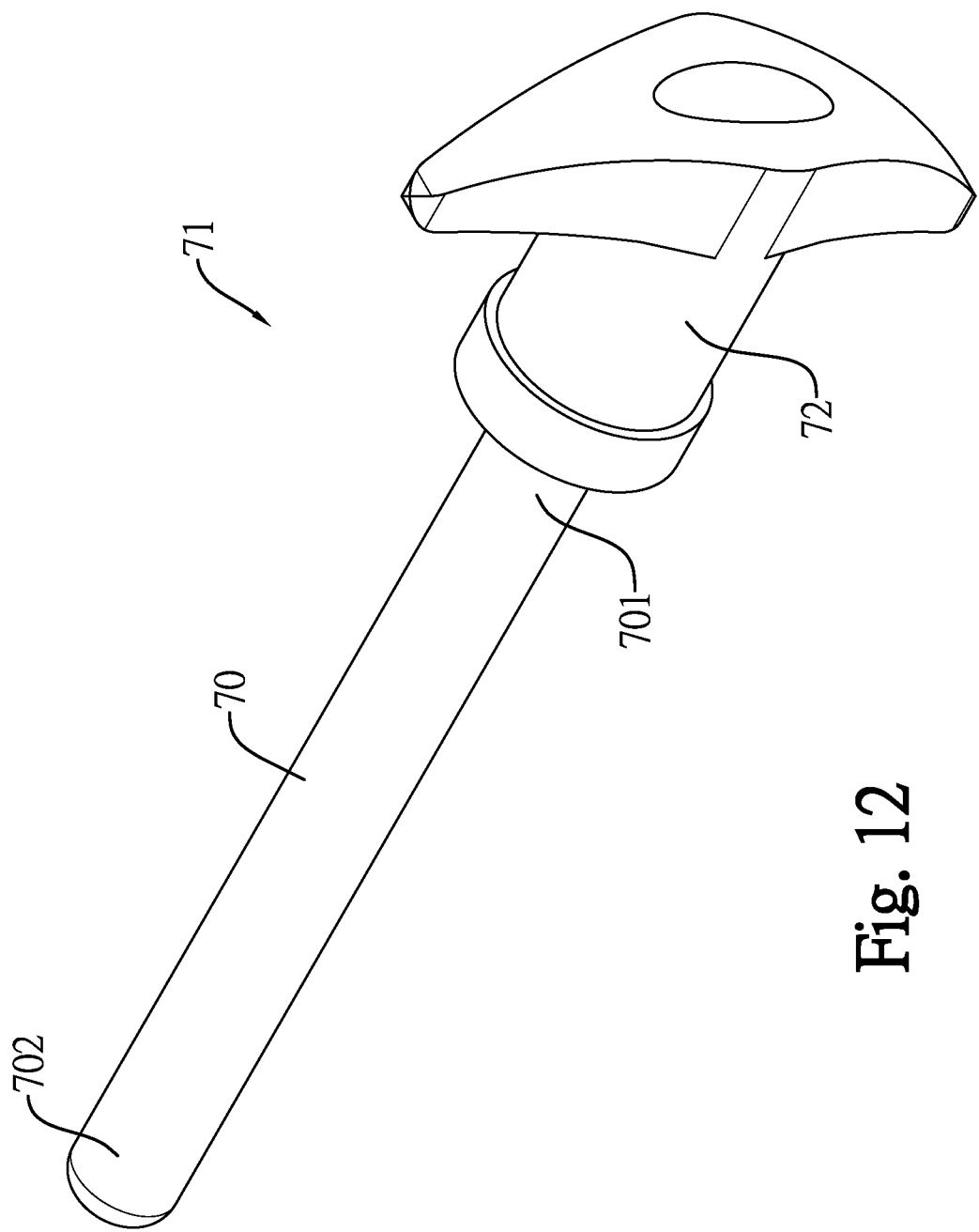
FIG. 12 is a perspective view of a fourth embodiment of the measured body of the present invention.
Figure 13:
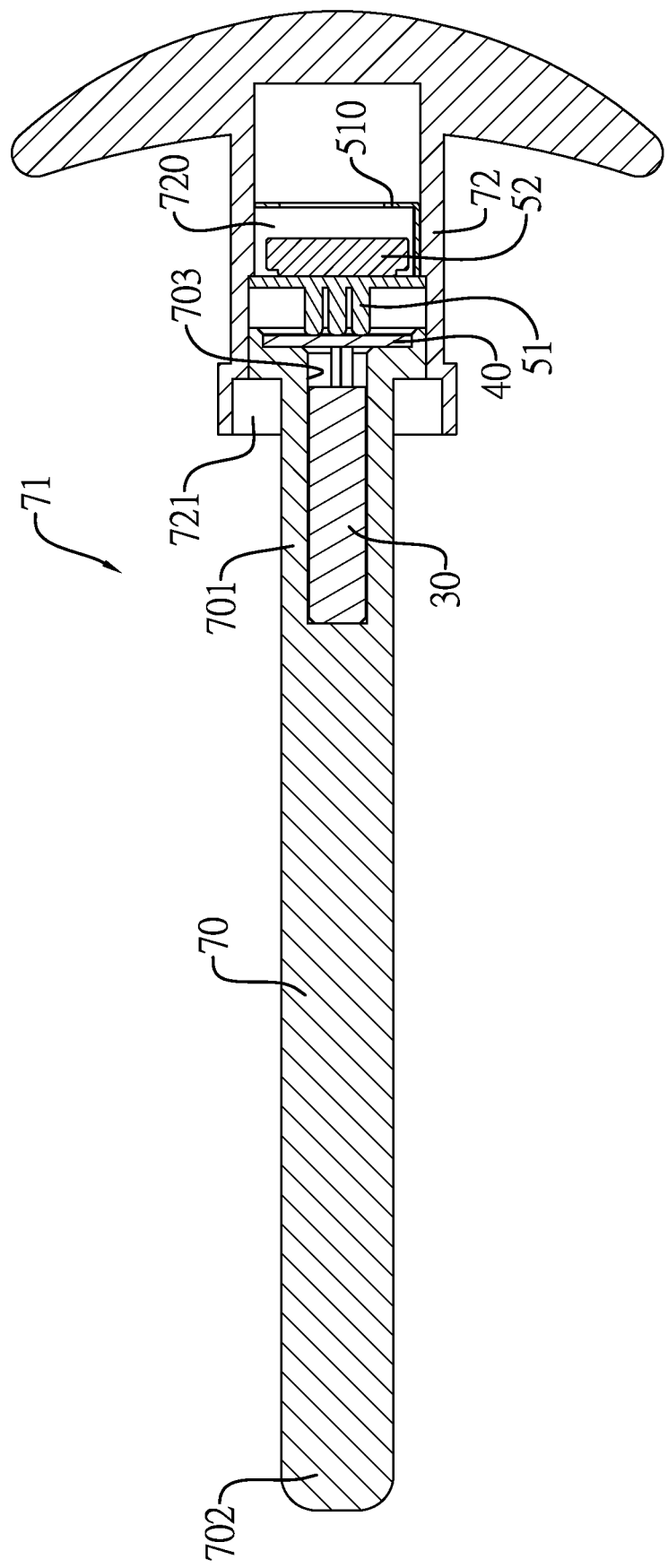
FIG. 13 is a cross-sectional view of the fourth embodiment of the measured body of the present invention.
Figure 14:
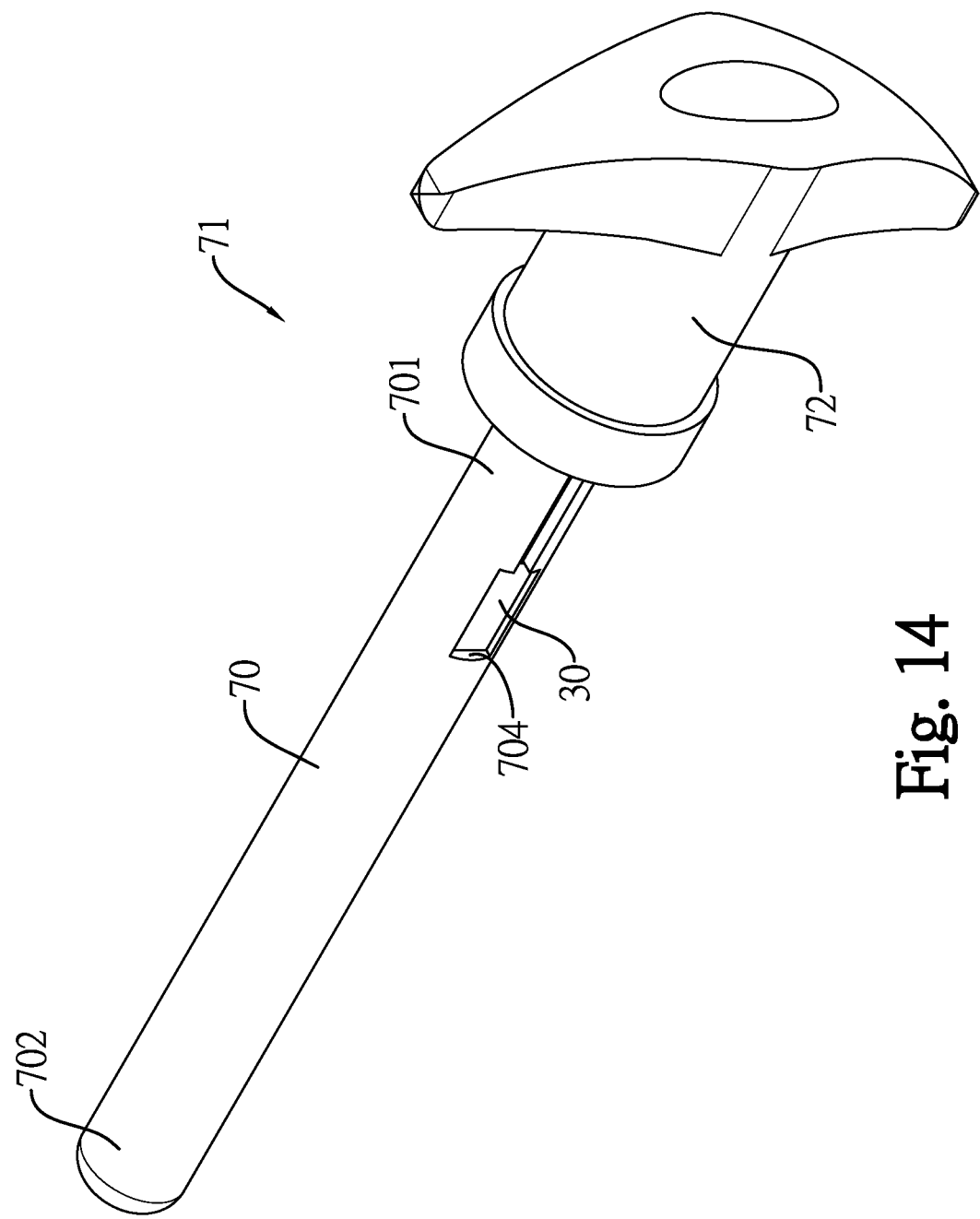
FIG. 14 is a perspective view of a fifth embodiment of the measured body of the present invention.
Figure 15:
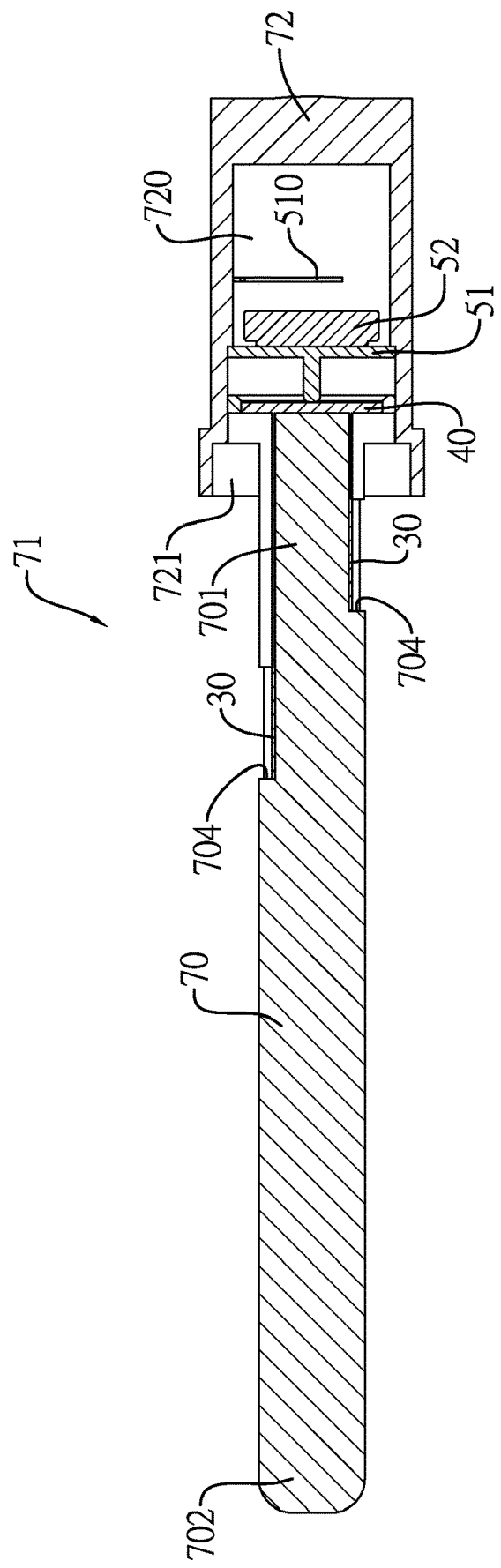
FIG. 15 is a cross-sectional view of the fifth embodiment of the measured body of the present invention.

Please refer to FIG. 12 and FIG. 13, a fourth embodiment of a measured body 70 can be an axle sleeve of a plug 71, and the measured body 70 (axle sleeve) has opposite first end 701 and second end 702. An end face of the first end 701 is concavely disposed with a recessed hole 703. The force sensor 30 can be a rod-shaped component and disposed in the recessed hole 703, and the surface of the force sensor 30 is fitted (for example, tightly fitted) to a wall surface of the recessed hole 703. Please refer to FIG. 14 and FIG. 15, in a fifth embodiment, an outer peripheral surface of the first end 701 of the axle sleeve can be concavely disposed with at least one groove 704, and the at least one force sensor 30 can be attached to a bottom surface of the groove 704. Please refer to FIG. 13 and FIG. 15, the first end 701 of the measured body 70 (axle sleeve) can be connected to a cover 72. The cover 72 has an accommodating space 720 and an opening 721 communicating with the accommodating space 720. The first end 701 of the measured body 70 (axle sleeve) is fixedly disposed at the opening 721. The Wheatstone bridge 57, the amplifier 53, the analog/digital converter 54 and the microcontroller 55 shown in FIG. 1 can be disposed on the circuit board 40. The circuit board 40 is electrically connected to the force sensor 30 and the data transmission module 51. The data transmission module 51 is connected to an antenna element 510. The power module 52 can be a battery. The circuit board 40, the data transmission module 51, the antenna element 510 and the power module 52 are disposed in the accommodating space 720. The second end 702 of the measured body 70 (axle sleeve) of the plug 71 is inserted into a jack of a load block of a weight training equipment, and the heavier the weight of the load block the measured body 70 (axle sleeve) is loaded with, the larger the deformation amount generated by the measured body 70 (axle sleeve), and the resistance value of the force sensor 30 also changes along with it. Therefore, the output voltage $V_G$ outputted by the Wheatstone bridge 57 can be changed along with the deformation of the measured body 70 (axle sleeve) for the microcontroller 55 to calculate the force taken information in order to reflect the weight of the load block, and wirelessly transmit the force taken information through the data transmission module 51 and the antenna element 510.

In summary, when the user operates the exercise equipment, the user directly applies a force to the measured body 10. When the user exerts a greater degree of force, the greater is the degree of deformation of the measured body 10; and conversely, when the user exerts a smaller degree of force, the smaller is the degree of deformation of the measured body 10. It can be seen that the degree of deformation of the measured body 10 and the sensing result of the force sensor 30 reflect the degree of application of force of the user. And the measurement signal generated by the Wheatstone bridge 57 changes along with the sensing result of the force sensor 30. Therefore, the measurement signal can reliably and directly reflect the degree of application of force of the user for the microcontroller 55 to perform the calculation, and the calculation result is externally transmitted to the receiving device 80 through the data transmission module 51 by wire or wirelessly for display or further use as a reference for the user.

Accordingly, it is to be understood that the embodiments of the invention described herein are merely illustrative of the application of the principles of the invention. Reference herein to details of the illustrated embodiments is not intended to limit the scope of the claims, which themselves recite those features regarded as essential to the invention.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A force measuring system for exercise equipment provided for using in an exercise equipment, comprising:
    a measured body for connecting the exercise equipment;
    at least one force sensor disposed on the measured body, a resistance value thereof changing according to a deformation amount of the measured body;
    a circuit board;
    a Wheatstone bridge disposed on the circuit board, the Wheatstone bridge being electrically connected to the at least one force sensor and generating an output voltage as a measurement signal;
    a data transmission module disposed on the circuit board to externally transmit a force taken information, the force taken information being obtained according to the measurement signal;
    a power module disposed on the circuit board and electrically connected to the Wheatstone bridge, the at least one force sensor and the data transmission module for providing a working power supply; and
    a receiving device connected to the data transmission module for receiving the force taken information,
    the measured body being a long rod, two opposite ends of the long rod being respectively grips, a center of the measured body being connected to a rope, and the at least one force sensor being attached to a surface of the measured body and adjacent to an outer circumference of the rope.

2. The force measuring system for exercise equipment as claimed in claim 1, the at least one force sensor being a load cell sensor or a strain gauge sensor.

3. The force measuring system for exercise equipment as claimed in claim 1, the circuit board being further disposed with following elements electrically connected to the power module:
    an amplifier electrically connected to the Wheatstone bridge force sensor;
    an analog/digital converter electrically connected to the amplifier; and
    a microcontroller electrically connected to the analog/digital converter and receiving the measurement signal to determine the force taken information according to the measurement signal.

4. The force measuring system for exercise equipment as claimed in claim 3, an accelerometer being disposed on the measured body, the accelerometer generating an acceleration signal according to the moving state of the measured body, and the microcontroller being electrically connected to the accelerometer for receiving the acceleration signal in order to calculate the motion speed.

5. The force measuring system for exercise equipment as claimed in claim 1, the power module being a rechargeable battery or a non-rechargeable battery.

6. A force measuring system for exercise equipment provided for using in an exercise equipment, comprising:
- a measured body for connecting the exercise equipment;
- at least one force sensor disposed on the measured body, a resistance value thereof changing according to a deformation amount of the measured body;
- a circuit board;
- a Wheatstone bridge disposed on the circuit board, the Wheatstone bridge being electrically connected to the at least one force sensor and generating an output voltage as a measurement signal;
- a data transmission module disposed on the circuit board to externally transmit a force taken information, the force taken information being obtained according to the measurement signal;
- a power module disposed on the circuit board and electrically connected to the Wheatstone bridge, the at least one force sensor and the data transmission module for providing a working power supply; and
- a receiving device connected to the data transmission module for receiving the force taken information,
- the measured body comprising a first connecting end portion, a second connecting end portion, a first outer peripheral surface, a second outer peripheral surface, two side surfaces, a recess, a first slot and a second slot;
- the first connecting end portion and the second connecting end portion being oppositely disposed, the first outer peripheral surface and the second outer peripheral surface being oppositely disposed and connected to the first connecting end portion and the second connecting end portion respectively, the two side surfaces being two opposite sides and perpendicular to the first outer peripheral surface and the second outer peripheral surface, the recess being concavely disposed at a central position of either one of the side surfaces, the first slot extending from the first outer peripheral surface toward the second outer peripheral surface, an end of the first slot being located on one side of the recess and maintaining a spacing from the second outer peripheral surface, the second slot extending from the second outer peripheral surface toward the first outer peripheral surface, an end of the second slot being located on another side of the recess and maintaining a spacing from the first outer peripheral surface, wherein the second slot is parallel to the first slot, the first slot and the second slot go through the two side surfaces; and
- the at least one force sensor being disposed on an inner ring wall surface of the recess.

7. The force measuring system for exercise equipment as claimed in claim 6, the first connecting end portion of the measured body being connected to a center of a long rod, two opposite ends of the long rod being respectively grips, and the second connecting end portion of the measured body being connected to a rope.

8. The force measuring system for exercise equipment as claimed in claim 6, the measured body being disposed in a housing, the circuit board being disposed on an outer surface of the housing, the first connecting end portion of the measured body being connected to a first rope, and the second connecting end portion being connected to a second rope.

9. The force measuring system for exercise equipment as claimed in claim 6, the measured body being a member made of an aluminum alloy.

10. A force measuring system for exercise equipment provided for using in an exercise equipment, comprising:
- a measured body for connecting the exercise equipment;
- at least one force sensor disposed on the measured body, a resistance value thereof changing according to a deformation amount of the measured body;
- a circuit board;
- a Wheatstone bridge disposed on the circuit board, the Wheatstone bridge being electrically connected to the at least one force sensor and generating an output voltage as a measurement signal;
- a data transmission module disposed on the circuit board to externally transmit a force taken information, the force taken information being obtained according to the measurement signal;
- a power module disposed on the circuit board and electrically connected to the Wheatstone bridge, the at least one force sensor and the data transmission module for providing a working power supply; and
- a receiving device connected to the data transmission module for receiving the force taken information,
- the measured body being a pulley, the pulley being disposed with a sleeve at a center thereof, the diameter of the sleeve being smaller than the diameter of the measured body;
- an outer peripheral surface of the measured body being formed with a first fillister for disposing a first rope, one end of the first rope being fixed in the first fillister of the measured body by a first fixing member, another end of the first rope being for the user to hold;
- an outer peripheral surface of the sleeve being formed with a second fillister for disposing a second rope, one end of the second rope being fixed in the second fillister by a second fixing member, another end of the second rope being connected to a load unit; and
- the at least one force sensor being disposed on a side of the measured body at equal intervals along a circumference.

11. The force measuring system for exercise equipment as claimed in claim 10, the power module comprising a power generating coil and a magnet, the magnet being fixedly mounted on the exercise equipment and separated from the measured body, the power generating coil being disposed on the measured body to rotate along with the measured body, wherein the positions of the power generating coil and the magnet correspond to each other.

* * * * *